Figure 1:
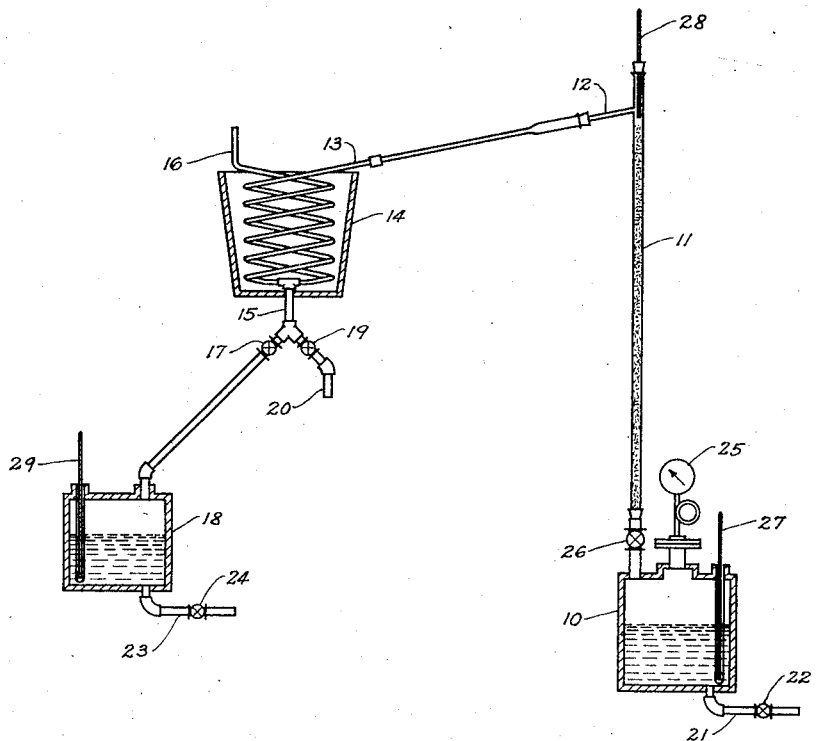

March 27, 1945.   A. L. WARD   2,372,237
PROCESS FOR CONVERTING DICYCLOPENTADIENE TO CYCLOPENTADIENE
Filed March 2, 1942   2 Sheets—Sheet 1

Alger L. Ward
INVENTOR

Hugo G. Kemman
ATTORNEY

March 27, 1945. A. L. WARD 2,372,237
PROCESS FOR CONVERTING DICYCLOPENTADIENE TO CYCLOPENTADIENE
Filed March 2, 1942 2 Sheets-Sheet 2

Patented Mar. 27, 1945

2,372,237

UNITED STATES PATENT OFFICE 2,372,237

PROCESS FOR CONVERTING DICYCLOPENTADIENE TO CYCLOPENTADIENE

Alger L. Ward, Bala-Cynwyd, Pa., assignor to The United Gas Improvement Company, a corporation of Pennsylvania Application March 2, 1942, Serial No. 433,091

3 Claims. (Cl. 260—666)

This application is a continuation-in-part of my copending application Serial No. 188,877, filed February 5, 1938.

This invention pertains generally to the purification of hydrocarbons, and pertains particularly to the purification of dicyclopentadiene.

There are various sources of dicyclopentadiene.

For instance, the liquid mixtures of hydrocarbons produced in the manufacture of coal gas, coke oven gas, carburetted water gas, and oil gas, and generally in the crackling of oils, usually contain some dicyclopentadiene.

A rough separation may be made by distillation, but this tool is wholly incapable of producing a relatively pure fraction of this material apparently because of the presence of contaminating substances of similar boiling point.

Solutions of dicyclopentadiene of various concentrations are also produced in the practice of the invention of my copending application Serial Number 170,508, filed October 22, 1937, now Patent 2,211,038, dated August 13, 1940.

Other sources of dicyclopentadiene are known, or may develop from time to time, but the usual conditions under which it is produced apparently preclude the substantially complete removal of all contaminations by way of distillation.

Likewise, the conditions under which the monomer, cyclopentadiene, is usually produced, for instance in the above-mentioned processes for the manufacture of gas, apparently preclude the substantially complete separation of cyclopentadiene by way of distillation. This is apparently because of the simultaneous production of materials of similar boiling point, of which isoprene and piperylene are examples.

When such mixtures of cyclopentadiene having present other materials such as isoprene and piperylene are treated in accordance with the invention of my above mentioned copending application for the purpose of selectively dimerizing the cyclopentadiene, there is invariably formed a small quantity of the dimers of isoprene and piperylene. Both of these dimers are subject to heat depolymerization.

When the dicyclopentadiene in a solution, such as of hydrocarbons produced by distillation of the above-mentioned hydrocarbon liquids or by the process of my above mentioned copending application is depolymerized to cyclopentadiene by the application of heat, and regardless of the concentration of dicyclopentadiene in the solution provided the initial boiling point is not too low, the cyclopentadiene vapors produced are not contaminated with vapors of materials of similar boiling point, and consequently such cyclopentadiene vapors are capable of a high degree of purification by fractionation.

In carrying out my invention, therefore, if I find that a solution of dicyclopentadiene contains low boiling material, such material is first removed by distillation preferably at reduced pressure such as 25 mm., absolute.

If the solution does not contain valuable material boiling higher than dicyclopentadiene a convenient point at which to stop the distillation is at a temperature equivalent to about 160° C. at atmospheric pressure.

In this case the dicyclopentadiene is, of course, concentrated in the residuum.

On the other hand, if valuable higher boiling material subject to serious contamination with polycyclopentadiene is present, of which indene is an example, I continue the distillation and take the crude dicyclopentadiene off overhead.

In any event, and regardless of how the dicyclopentadiene has been produced, I subject it to heating at or near its boiling point.

Since the pot temperatures are in the neighborhood of the boiling point of dicyclopentadiene the monomer when formed is not only in the vapor phase but the vapor is considerably superheated.

Because of this high superheat the cyclopentadiene in these vapors is in a highly unstable state. Therefore unless certain highly specialized conditions are maintained large quantities of cyclopentadiene vapors will polymerize to polycyclopentadiene to greatly decrease the yield since polycyclopentadiene cannot be depolymerized satisfactorily.

Furthermore, the quantity of polycyclopentadiene formed during the depolymerization of dicyclopentadiene is a function of the time required for complete depolymerization. My highly specialized conditions which permit rapid separation of the cyclopentadiene vapors also permit increasing the rate of the depolymerization, and therefore by reducing the time at which dicyclopentadiene is heated, reduce the quantity of polycyclopentadiene formed.

Accordingly, and in accordance with this invention, dicyclopentadiene is converted by depolymerization into pure cyclopentadiene under specialized conditions to obtain high yields. This cyclopentadiene in turn may be converted into pure dicyclopentadiene for storage or shipping or otherwise because of the higher stability of the dimer.

Figure 2:
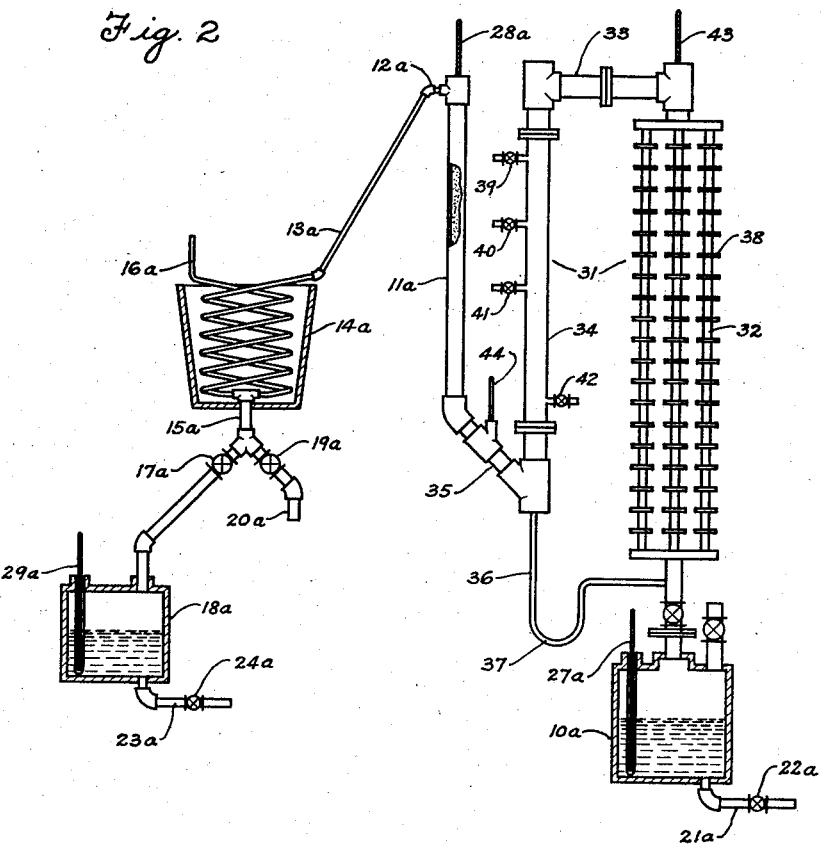

Further features of the invention reside in the construction, arrangement and combination of parts, and in the steps, combinations of steps and sequences of steps, all of which together with other features will become more apparent to persons skilled in the art as the specification proceeds and upon reference to the drawings in which:

Figure 1 is an elevation diagrammatically illustrating one form of apparatus for carrying out the process; and Figure 2 is an elevation diagrammatically illustrating another form of apparatus for carrying out the process.

Referring now more particularly to Figure 1, at 10 is shown a still pot to which is attached a packed column 11, a side arm 12 of which is connected to one end of coil 13 of condenser 14.

The other end of coil 13 is connected to one branch of a Y 15 in common with one end of a second coil 16 of condenser 14.

The other end of coil 16 is shown open to the atmosphere and in this sense serves as a vent, although it may also serve as a connection for pressure regulating mechanism should a pressure above or below atmospheric be desired, or should it be desired to avoid changes in barometric pressure.

Another branch of Y 15 is connected through valve 17 to still pot 18, and the third branch of Y 15 is connected through valve 19 to outlet 20 which may lead to a receiver (not shown).

Still 10 is provided with a drain 21 controlled by valve 22 and still 18 is provided with drain 23 controlled by valve 24.

Still 10 is also shown equipped with pressure gauge 25 and with a valve 26 in the outlet to column 11.

Thermometers are illustrated at 27 in still 10, at 28 at the top of column 11, and at 29 in still 18. Obviously any other suitable temperature registering or recording devices might be substituted.

In an illustrative operation of the apparatus of Figure 1, a solution of dicyclopentadiene is placed in still 10 and the still is heated by any suitable means such as a gas flame, by electrical means, or otherwise.

Valve 26 is of course open and as the temperature in still 10 approaches the boiling point of dicyclopentodiene, depolymerization begins and the highly superheated cyclopentadiene vapors thus formed escape up into column 11.

As shown, no heat insulation is provided on column 11, and consequently the vapors are cooled as they ascend through the column.

The rate of heating at still 10 is regulated so that this cooling is sufficient to reduce the temperature of the vapors at 28 to a point below 45° C. As a result higher boiling materials are condensed and refluxed leaving highly purified cyclopentadiene vapors to escape into coil 13 of condenser 14. The cooling medium in condenser 14 may be a water and ice mixture.

The condensate formed in coil 13 may be drained through valve 19 into a receiver (not shown).

On the other hand, should it be desired to convert the purified cyclopentadiene into pure dicyclopentadiene, for instance, for storage or shipping, the condensate formed in coil 13 is conveniently drained into still 18 through valve 17, in which case the cyclopentadiene is conveniently polymerized to dicyclopentadiene in the following manner.

As soon as a quantity of cyclopentadiene sufficient for heating has accumulated in still 18, the still is also heated in any convenient manner to cause cyclopentadiene to vaporize. On the other hand since this very pure cyclopentadiene is subject to spontaneous auto-polymerization which is an exothermic reaction, in the event of auto-polymerization the application of external heat is delayed until required to complete the reaction.

The vapors ascend into coil 16 and possibly also into coil 13, are condensed, and the condensate flows back into still 18. Since dicyclopentadiene is formed rapidly from pure cyclopentadiene at the boiling point of cyclopentadiene, dicyclopentadiene accumulates in still 18.

After the charge in still 10 has become exhausted, that is incapable of producing further cyclopentadiene, polymerization is continued in still 18 until complete.

Dicyclopentadiene is drained from still 18 through valve 24, and any residue is drained from still 10 through valve 22.

If desired cyclopentadiene may be withdrawn at 20 and returned to the top of column 11 to provide additional reflux, or additional reflux may be provided in any other manner. However, the equivalent of only a few theoretically perfect plates is required to separate the cyclopentadiene.

The apparatus disclosed in Figure 1 is highly efficient when of small size, for instance, when still 10 is a 500 cubic centimeter glass flask and the other parts are of comparable size. These efficiencies, however, fall off at a very rapid rate as the apparatus is enlarged to increase its capacity.

The term efficiency is here used to denote the percentage of dicyclopentadiene which is recovered as cyclopentadiene. The rest goes to polycyclopentadiene.

I have discovered that the falling off in efficiency is closely related to the rate of cooling of superheated cyclopentadiene vapors, and that if the apparatus is modified to provide for rapid and thorough cooling of these vapors, which in turn permits rapid depolymerization, satisfactory efficiencies may be maintained in larger size apparatus. However, the rate of cooling of the vapors near the still pot should not be so high that large quantities of cyclopentadiene are dissolved in the condensed dicyclopentadiene returned to the still pot. Rather, the cooling should be so controlled that the bulk of the dicyclopentadiene is condensed and returned to the still pot at a temperature substantially above the boiling point of cyclopentadiene.

In other words, it is desirable, from the standpoint of obtaining high yields through the avoidance of undesired side reactions, to separate cyclopentadiene vapors from the dicyclopentadiene which has been vaporized but which is undepolymerized by rapidly abstracting the latent heat of vaporization from the dicyclopentadiene vapors, thereby condensing them while at the same time avoiding the abstraction of large quantities of sensible heat from the resulting condensate, and by removing the cyclopentadiene vapors from contact with the condensed dicyclopentadiene while the latter is at a relatively high temperature, thereby avoiding the absorption of large quantities of cyclopentadiene vapor by the condensed dicyclopentadiene.

The condensed dicyclopentadiene is thereafter returned to the still for reheating, while the cyclopentadiene vapors are thereafter further cooled and separately condensed.

This is illustrated in Figure 2 wherein corresponding parts bear the same reference numerals with the addition of the letter a.

It will be noted that in Figure 2 means for the rapid, but controlled, cooling of cyclopentadiene vapors as they are produced (illustrated generally at 31) has been inserted between column 11a and still 10a.

As illustrated means 31 comprises a rising section 32, a return bend 33 and a descending section 34, the latter being attached at its lower end to an upwardly sloping part 35, to which in turn is attached the lower end of column 11a.

Tube 36 having a portion 37 shaped to provide a liquid seal connects part 35 with still 10a and serves to return condensate from descending section 34 and from column 11a to still 10a.

For purposes of illustration, rising section 32 is shown with cooling fins 38, although any other suitable cooling means such as a jacket for the circulation of cooling liquid may be substituted. The cooling is not so rapid as to allow large quantities of cyclopentadiene to return to the pot 10a with condensed dicyclopentadiene.

Likewise descending section 34 is shown with a jacket with a plurality of connections 39, 40, 41 and 42 for the circulation of cooling liquid, although any other suitable cooling means may be substituted.

The plurality of connections 39, 40, 41 and 42 are for the control of temperature along descending section 34 through the control of the circulation of cooling liquid.

Additional thermometers are illustrated at 43 at the top of rising section 32, and at 44 in part 35. Obviously any other temperature registering or recording devices may be substituted.

The operation of the apparatus shown in Figure 2 is in all respects similar to that of Figure 1, except that the vapors are rapidly and uniformly cooled before entering the column 11a. The production of polycyclopentadiene is thus materially reduced over what it would be if cooling means 31 were not provided. Consequently the production of cyclopentadiene is increased.

As an illustration of this cooling effect the temperatures of the vapors leaving still 10a may be, for instance, between 160° and 200° C., depending upon how far the depolymerization has progressed. The temperature of the vapors may be reduced during their flow so that the temperature at 43 is between 70° and 110° C. at 44 between 45° and 50° C., and at 28a below 45° C.

In such case the purity of cyclopentadiene is ordinarily above 98%, and frequently above 99% with careful operation.

As the apparatus is illustrated all condensate except the final condensate is returned to still 10a.

The following examples will illustrate the invention.

EXAMPLE 1

Small laboratory glass apparatus corresponding to that illustrated in Figure 1 was employed.

323.1 grams of crude dicyclopentadiene were charged to still 10 and heated to a depolymerizing temperature. The cyclopentadiene was collected in still 18. The yield was 93.6%.

Still 18 was then heated at 90° to 100° C. for 24 hours. The polymerized product collected in still 18 contained a small amount of oil which was decanted off.

Two separate samples of this polymerized product were tested for purity as follows:

A sample was tested as to melting point which was found to be between 28° C. and 30° C. 100% pure dicyclopentadiene melts at approximately 32° C. Since only a very small quantity of an impurity is sufficient to depress a melting point, these results indicate that a dicyclopentadiene of very high purity was obtained as the result of my process.

The second sample was subjected to fractional distillation and a middle cut comprising 82% of the original sample was arbitrarily taken. Its boiling point was substantially constant at approximately 86° C., at 50 millimeters pressure and its melting point was approximately 32° C., indicating a very high grade product.

The latter procedure is of particular interest from the standpoint of purification by distillation. This would be impossible with the original material, even though an efficient column and a high reflux ratio were used. The above test shows that dicyclopentadiene purified in accordance with my invention can be made substantially 100% pure by the added step of fractional distillation.

EXAMPLE 2

In this example the apparatus of Figure 1 was employed in considerably larger size. Still 10, for instance, had a capacity of 10 gallons and the rest of the apparatus conformed thereto.

The purpose of this example is to demonstrate the enormous loss in yield incident to the mere enlargement of the laboratory apparatus.

The starting material contained approximately 33.9% dicyclopentadiene.

23,166 grams of this crude dicyclopentadiene were charged to still 10 of the larger apparatus and heated. A period of 48 hours was required for complete depolymerization during which time still temperatures varied from 163° C. to 200° C.

In an effort to speed up the process and increase the yield at the expense of purity, the temperature at the top of column 11, namely, at thermometer 28, was held at 50° C. instead of below 45° C. The distillate was collected in still 18 and was simultaneously polymerized by gradually increasing the temperature from 40° C. to 80° C. for four hours and holding the temperature at 80° C. for another four hours.

The yield in dicyclopentadiene as the result of this repolymerization, was 2631 grams, which is only about 33.3% of what would have been obtained had the efficiency of the small laboratory apparatus been retained in the larger apparatus.

The freezing point of the repolymerized material was approximately −23° C. to −25° C., showing that it was rather impure.

EXAMPLE 3

In this example apparatus somewhat similar to that of Figure 2 was employed except that rising section 32 was a straight tube, and was not equipped with fins 38 or other heat transfer means for abstracting heat from the vapors passing therethrough.

The purpose of this example is to demonstrate the problems involved in the transition from laboratory apparatus to plant apparatus, and when compared to Example 4 to show the new and unexpected results obtained by the rapid, uniform, and non-abrupt cooling provided in Example 4.

The starting material contained approximately 65.0% dicyclopentadiene.

19,493 grams of this material was charged to still 10a which was heated with progressively rising temperature ranging from 165° C. to 188° C. over a period of twenty hours.

The temperature at 28a was maintained below 45° C.

The cyclopentadiene thus produced was collected in still 18a wherein it was heated over a period of three hours at a gradually increasing temperature ranging from 40° C. to 80° C. followed by heating, for an additional two hours, at 80° C.

The yield of repolymerized dicyclopentadiene was 8662 grams, or 68.3% of what would have been obtained had the efficiency of Example 1 been reproducible.

The repolymerized dicyclopentadiene had a freezing point between −2° C. and −4° C.

EXAMPLE 4

In this example the improved apparatus shown in Figure 2 was employed.

The charging material contained approximately 33.4% dicylopentadiene.

20,364 grams of this material was charged to still 10a and heated for a period of 6¼ hours at a temperature ranging from 168° C. to 196° C.

The overhead temperature (at 28a) varied between 38° C. and 45° C.

The yield of cyclopentadiene was 97.3% of what would have been obtained had Example 1 been exactly reproducible and its quality was very high.

The following summary shows a comparison of the time required for depolymerization and the efficiency of the apparatus used in Examples 2, 3 and 4, and demonstrates the superiority of the apparatus of Figure 2 when operating on a plant scale.

Table

| Example | Charge in grams | Time of heating in hours | Per cent yield |
| --- | --- | --- | --- |
| 2 | 23,166 | 48 | 33.3 |
| 3 | 19,493 | 20 | 68.3 |
| 4 | 20,364 | 6¼ | 97.3 |

It will be understood, from the above, that the rate at which the heating and condensation is effected has a very important bearing on the yield of cyclopentadiene obtained. This is an extremly important practical consideration in commercial depolymerization operations. The yield rises very sharply with increasing rates, because of the tendency to suppress undesired side reactions thereby.

It is very desirable that the heating and condensing be conducted in such manner and with sufficient rapidity to recover separately condensed cyclopentadiene at an average rate of at least approximately 7% per hour, based upon the dicyclopentadiene contained in the charge and preferably at a rate of at least approximately 15% per hour.

While in the above examples the cyclopentadiene was repolymerized at atmospheric pressure, which was made possible by its high purity, repolymerization might have been effected at any other suitable pressure.

Other means may be provided for the rapid and gradual that is, non-abrupt cooling of the cyclopentadiene vapors and in this connection any means known in the art for the rapid withdrawal of heat from materials in the vapor phase might be substituted, particularly when provision is made for high vapor velocities.

It is to be understood that the above particular description is by way of illustration. Therefore, changes, omissions, additions, substitutions and/or modifications might be made within the scope of the claims without departing from the spirit of the invention which is intended to be limited only as required by the prior art.

I claim:

1. A process for depolymerizing dicyclopentadiene which is free from materials boiling in the neighborhood of cyclopentadiene, with a relatively large yield of substantially pure cyclopentadiene, comprising heating a body of said dicyclopentadiene under temperature conditions between 160 and 200° C. and sufficiently to vaporize dicyclopentadiene and to convert dicyclopentadiene to cyclopentadiene, rapidly cooling the resulting vapors of dicyclopentadiene and superheated cyclopentadiene in a manner to abstract the latent heat from said dicyclopentadiene vapors and thus condense said dicyclopentadiene vapors without abstracting large quantities of sensible heat from the resulting condensed dicyclopentadiene thereby avoiding the condensation therewith of substantial quantities of said cyclopentadiene vapors, rapidly removing said condensed dicyclopentadiene from contact with said cyclopentadiene vapors while at a relatively high temperature, thereafter cooling said cyclopentadiene vapors to recover separately a condensate of substantially pure cyclopentadiene, and favoring a high yield of cyclopentadiene by conducting said heating and condensing operations in a manner and with sufficient rapidity to recover said separately condensed cyclopentadiene at an average rate of at least 7% per hour based on the dicyclopentadiene contained in said original body.

2. A process for depolymerizing dicyclopentadiene which is free from materials boiling in the neighborhood of cyclopentadiene, with a relatively large yield of substantially pure cyclopentadiene, comprising heating a body of said dicyclopentadiene under temperature conditions between 160 and 200° C. and sufficiently to vaporize dicyclopentadiene and to convert dicyclopentadiene to cyclopentadiene, rapidly cooling the resulting vapors of dicyclopentadiene and superheated cyclopentadiene in a manner to abstract the latent heat from said dicyclopentadiene vapors and thus condense said dicyclopentadiene vapors without abstracting large quantities of sensible heat from the resulting condensed dicyclopentadiene thereby avoiding the condensation therewith of substantial quantities of said cyclopentadiene vapors, rapidly removing said condensed dicyclopentadiene from contact with said cyclopentadiene vapors while at a temperature sufficiently above the boiling point of cyclopentadiene to avoid the absorption of large quantities of cyclopentadiene vapors by said condensed dicyclopentadiene, thereafter cooling said cyclopentadiene vapors to recover separately a condensate of substantially pure cyclopentadiene, and favoring a high yield of cyclopentadiene by conducting said heating and condensing operations in a manner and with sufficient rapidity to recover said separately condensed cyclopentadiene at an average rate of at least 15% per hour based on the dicyclopentadiene contained in said original body.

3. A process for depolymerizing dicyclopentadiene which is free from material boiling in the neighborhood of cyclopentadiene, comprising heating a body of said dicyclopentadiene under temperature conditions between 160 and 200° C. and sufficiently to vaporize dicyclopentadiene and to convert dicyclopentadiene to cyclopentadiene, selectively condensing resulting vapors of undepolymerized material and separating the resulting condensate from contact with resulting uncondensed cyclopentadiene vapors under temperature conditions sufficiently high to avoid the absorption in said condensate of large quantities of said cyclopentadiene vapors, thereafter cooling said cyclopentadiene vapors and recovering the same separately as condensate, returning said first mentioned condensate to said body of dicyclopentadiene undergoing heating for further heating therewith, and favoring a high yield of cyclopentadiene by conducting said heating and condensing operations in a manner and with sufficient rapidity to recover said separately condensed cyclopentadiene at an average rate of at least 7% per hour based on the dicyclopentadiene contained in said original body.

ALGER L. WARD.